No. 871,607. PATENTED NOV. 19, 1907.
J. E. MONTGOMERY.
PACKING NUT FOR WATER AND OIL GAGES.
APPLICATION FILED AUG. 10, 1906.
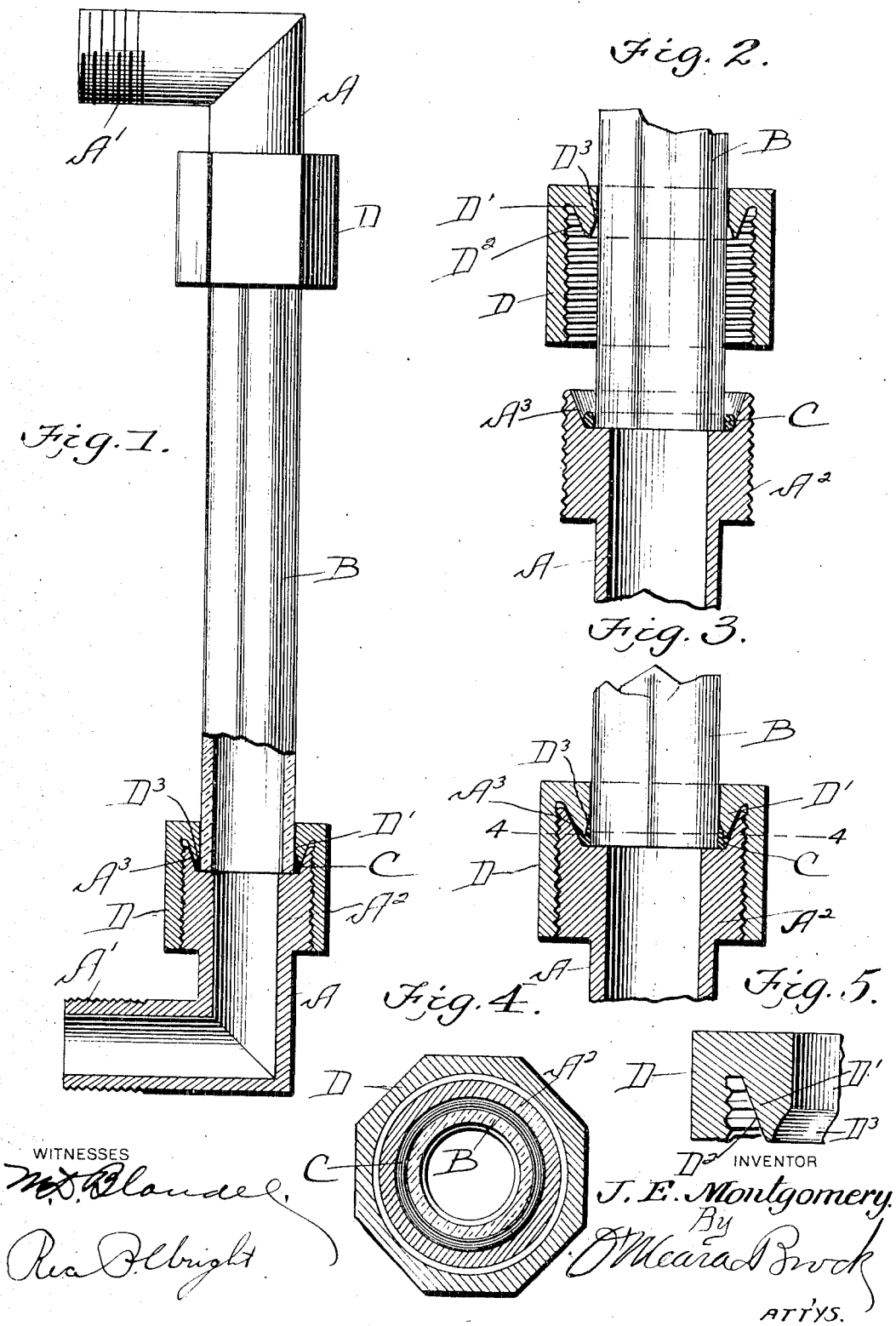

UNITED STATES PATENT OFFICE.

JOHN EDWARD MONTGOMERY, OF YOST, UTAH.

PACKING-NUT FOR WATER AND OIL GAGES.

No. 871,607.  Specification of Letters Patent.  Patented Nov. 19, 1907.

Application filed August 10, 1906. Serial No. 330,029.

To all whom it may concern:

Be it known that I, JOHN EDWARD MONTGOMERY, a citizen of the United States, residing at Yost, in the county of Boxelder and State of Utah, have invented a new and useful Improvement in a Packing-Nut for Water and Oil Gages, of which the following is a specification.

This invention relates to packing nuts and more particularly to packing nuts for water or oil gages, the object being to provide a nut so constructed that the glass can be easily and quickly put in place and one in which a perfect water tight joint will be formed.

Another object of my invention is to provide a nut so constructed that the packing can be easily and quickly inserted, thereby overcoming the difficulties now existing with nuts in use of putting the packing up into the same.

With these objects of my invention in view, it consists in the novel features of construction, combination and arrangement of parts, hereinafter fully described, and pointed out in the claims.

In the drawings forming a part of this specification:—Figure 1 is a side elevational view partly in section, of my improved elbow and nut showing a glass secured thereon. Fig. 2 is a detail sectional view of my improved elbow and nut separated showing the glass in place. Fig. 3 is a detail sectional view of my improved elbow and nut united showing the glass secured thereon. Fig. 4 is a section taken on lines 4—4 of Fig. 3. Fig. 5 is a detail sectional view of the nut.

Referring to the drawing A indicates a pair of elbows provided with threaded ends A', adapted to be screwed into threaded openings formed in a boiler or oil chamber, as the case may be. The other ends of the elbows A are provided with enlarged threaded ends $A^2$, having a recess surrounding the bore of each elbow provided with a beveled wall $A^3$, in which the ends of the glass tube B is adapted to fit. A packing ring C, of rubber or any suitable material is placed on the ends of the glass in the recess adapted to be engaged by the annularly inwardly projecting tongues D', of the nuts D, which works on the enlarged threaded ends A, of the elbows. The tongues D', are provided with a beveled edge $D^2$, to correspond to the beveled walls $A^3$, of the recesses and are cut away at $D^3$, adjacent the point on their straight edges so that the packing rings C will be forced up against the glass B when screwed down on the threaded enlarged ends $A^2$, so as to securely hold the glass therein, and form a water tight joint.

From the foregoing description it will be readily seen that I have provided a packing nut so constructed that the glass or packing can be readily replaced when desired and one which will form a water tight joint and hold the glass in place.

Having thus fully described my invention, what I claim as new and desire to secure by Letters Patent is:—

In a device of the kind described, the combination with a pair of pipe elbows, having enlarged threaded ends provided with recesses having beveled walls surrounding the bore of the elbows, of a glass tube having its ends arranged in said recesses, packing rings secured around said ends in said recess, and a nut working on said threaded enlarged end having annularly inwardly projecting tongues provided with beveled edges and cut away portions adapted to fit said recesses and engage said packing rings, for the purpose described.

JOHN EDWARD MONTGOMERY.

Witnesses:
 JAMES N. MONTGOMERY,
 FRED CHADWICK.